Figure 1:
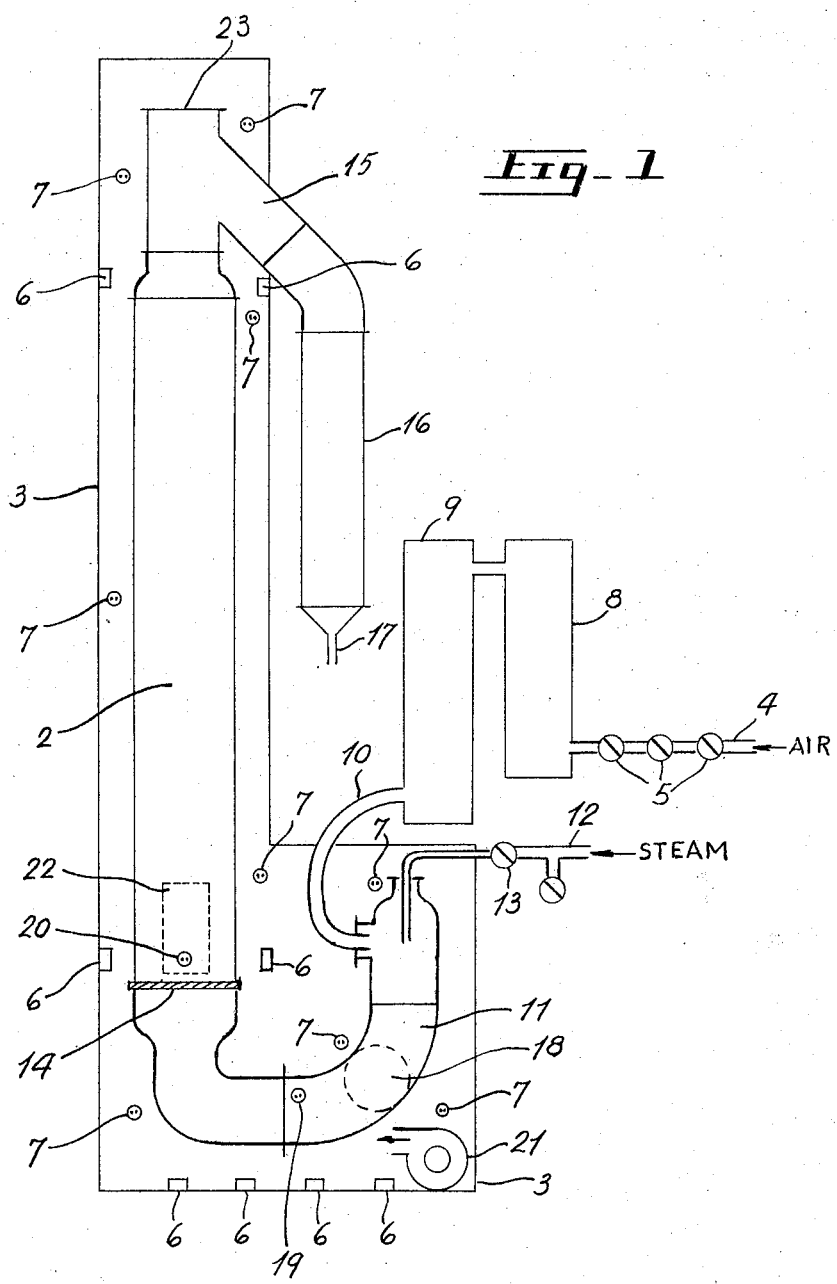

April 4, 1967  H. G. McADIE  3,312,524
PRODUCTION OF CALCIUM SULPHATE HEMIHYDRATE
Filed April 19, 1962  5 Sheets-Sheet 2

3,312,524
PRODUCTION OF CALCIUM SULPHATE HEMIHYDRATE
Henry George McAdie, Toronto, Ontario, Canada, assignor to Dominion Tar & Chemical Company, Limited, Montreal, Quebec, Canada
Filed Apr. 19, 1962, Ser. No. 188,663
5 Claims. (Cl. 23—122)

This invention relates to a method for producing calcium sulphate hemihydrate and more particularly to a method of calcining gypsum whereby a calcined product of predetermined properties is obtained.

In the manufacture of plaster of Paris, gypsum rock, which is essentially calcium sulphate dihydrate, is ground to a suitable particle size and heated in containers to drive off water of crystallization until it is substantially converted to calcium sulphate hemihydrate. The physical properties of the product so obtained usually undergo further changes as the hemihydrate is exposed to air for an extended period.

Hitherto the properties of the freshly calcined gypsum, as well as of the "aged" material, have been considered to be determined basically by the particular gypsum rock material from which it was obtained by calcining. Such properties as the consistency of the hemihydrate made from such gypsum, or the compressive strength, set time and the like, were considered as substantially given by the nature of the raw material, and susceptible of alteration only by a radical shift in the method of calcining, e.g., from calcining in kettles under atmospheric pressure to calcining in autoclaves under elevated pressure. Attempts have been made to produce plaster having artificially induced properties, notably a tensile and compressive strength of a high order not normally occurring in the natural product, but most known attempts were based on calcining in a steam atmosphere at superatmospheric pressures.

I have found that, in processes where the calcining of gypsum is carried out under atmospheric pressure, the properties of the hemihydrate can be varied in a controlled manner by varying the ambient water vapour pressure during calcination.

I have found, more particularly, that in said processes the properties of the hemihydrate vary in a linear relationship with the value of the water vapour pressure in the atmosphere in which the calcination is taking place.

Substantially all physical properties of plaster lend themselves to controlled variation in accordance with the present invention. It will be obvious, however, that for the common uses of plaster certain properties are more important than others; the invention will therefore be described with particular reference to such properties of prime practical importance, e.g., consistency, compressive strength and set time. These properties are interrelated, and when one is varied the others vary with it. By the present invention it becomes possible to select beforehand a value, e.g., for consistency, provided the selected value is within the range of values normally occurring in the particular hemihydrate and by maintaining a corresponding, numerically determined, ambient water vapour pressure during the calcining of the natural rock, the selected value for said property will be substantially obtained in the calcined product.

The calcining processes in which use of the present invention is contemplated are those operating at atmospheric pressure, e.g., in kettles, and the range of water vapour pressure variation during calcining will therefore be, theoretically, between 0 mm. and 760 mm. Hg. To each value of water vapour pressure in this range will correspond a determined value of any particular selected physical property. The exact arithmetical value of any such particular property may, and generally will, vary from sample to sample, depending on the origin of the gypsum, its natural properties, and the like. It will therefore be desirable to establish, with respect to each new sample of gypsum, certain "limit" values, e.g., the value of the particular physical properties in the calcined product corresponding to a water vapour pressure in the calcining atmosphere equal to 0 mm. and the value of said properties corresponding to a water vapour pressure of 760 mm. These "limit" values can be found by a few simple experiments and by constructing a diagram characteristic of the given sample, as explained in more detail hereinbelow. If the first of the values thus found is denoted as $C_0$ and the second as $C_{760}$, any predetermined value $C$ of the particular selected property in the calcined product will be related to the corresponding water vapour pressure $p$ in the calcining atmosphere by means of the approximate formula:

$$\frac{p}{760} = \frac{C - C_0}{C_{760} - C_0}$$

where $p$ is measured in mm. Hg and $C$ in the appropriate units for the selected physical property. It will be evident that $p/760$ is the same as the percentage of water vapour by volume and the latter may be used as the operating variable.

It will be obvious that in carrying out the tests for finding the "limit" values mentioned above, the lower "limit" value need not necessarily correspond to a water vapour pressure of 0 mm. Hg. In fact, it would be difficult to obtain directly meaningful values, e.g., for consistency, for a sample calcined in an atmosphere kept perfectly dry, because of the relatively large proportion of anhydrous calcium sulphate (soluble anhydrite) that would form in such conditions. The above disclosed linear relationship between water vapour pressure and the measurable properties of calcined gypsum relates essentially to calcination under conditions favouring the formation of hemihydrate and under which formation of the soluble anhydrite is generally not favoured. In order that all measurements be made on materials containing substantially only the hemihydrate, it was desirable to expose the sample to ambient moisture until rehydration of any soluble anhydrite was completed. I have found that exposure of the calcined product to air in ambient conditions for a week or less, or to an atmosphere maintained at 70° F. at 50% humidity for about 3 days, will generally result in the disappearance of any anhydrite that may have been formed with only minor changes in the physical properties of the product. In any case, hemihydrates produced in calcinations under different ambient water vapour pressures, but subsequently subjected to limited exposure to moisture under substantially uniform conditions, continue to exhibit the variation in properties shown to be dependent essentially upon the initial ambient water vapour pressure during calcination.

In a general way, "limit" values of particular properties (e.g. corresponding substantially to 0 mm. and 760 mm. vapour pressure during calcining) can be easily found by constructing a diagram representing the variation of said properties with variation in pressure, as shown hereinbelow. A few experimentally found values of said properties suffice for the constructing of such a diagram which, being substantially linear, can be extrapolated to provide the value of the said property corresponding to 0 mm. water vapour pressure, or for that matter, any other "limit" value that may be selected for the practice of this invention. The relationship between the values of any of the aforesaid properties and the values of the corresponding water vapour pressure underlying the practice of the present invention, will thus be expressed, in a general way, by the formula $p = aC + b$, wherein $p$ is the partial water vapour pressure expressed in any convenient units (e.g. in mm. Hg or atmosphere), $C$ is the value of the particular property in suitable units, and $a$ and $b$ are constants experimentally derived in the manner herein described.

Figure 2:
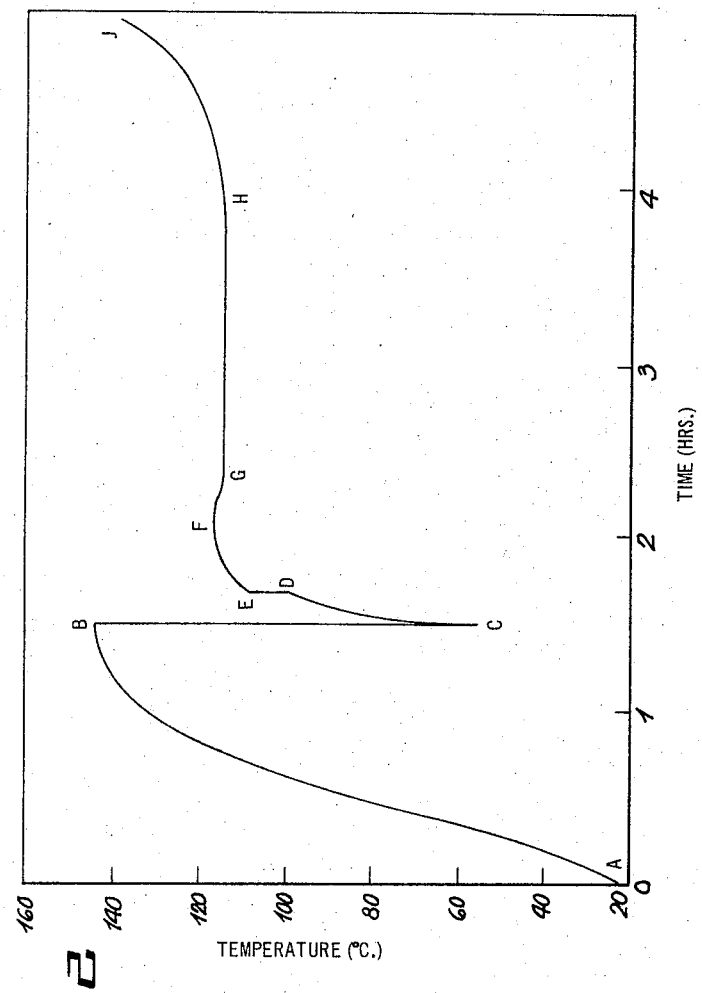
Figure 3:
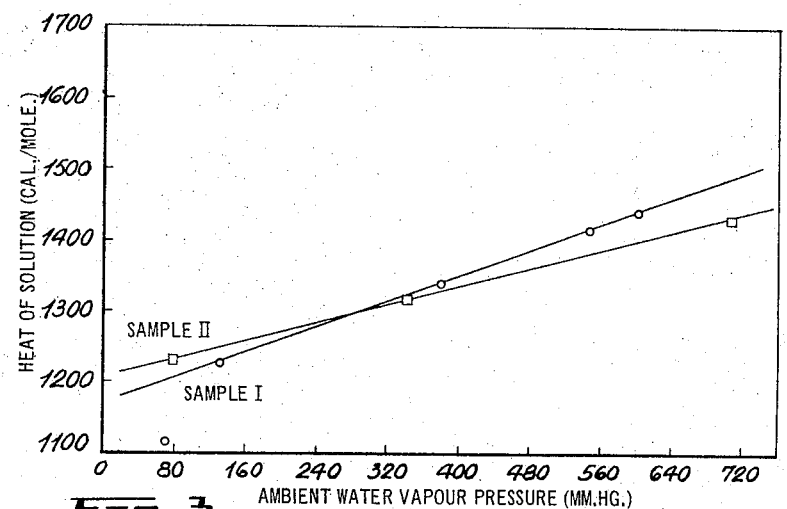
Figure 4:
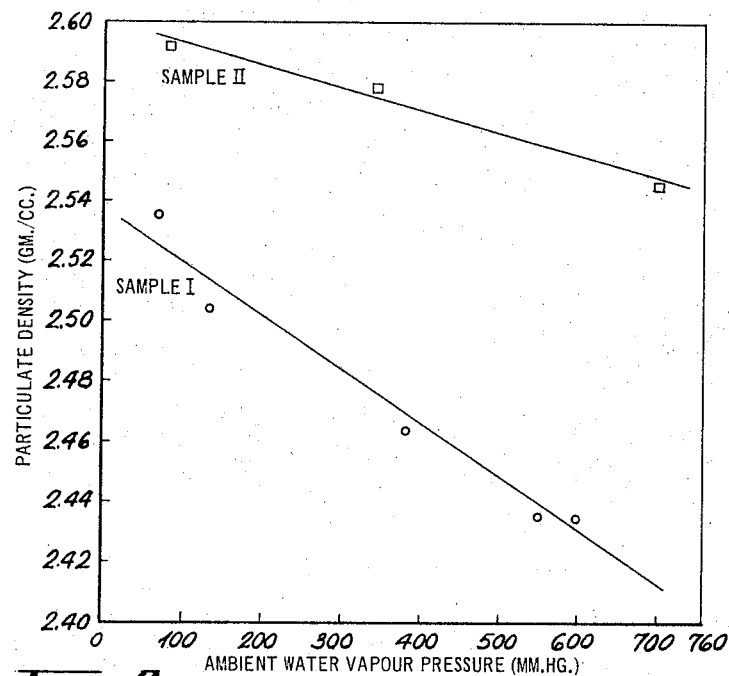
Figure 5:
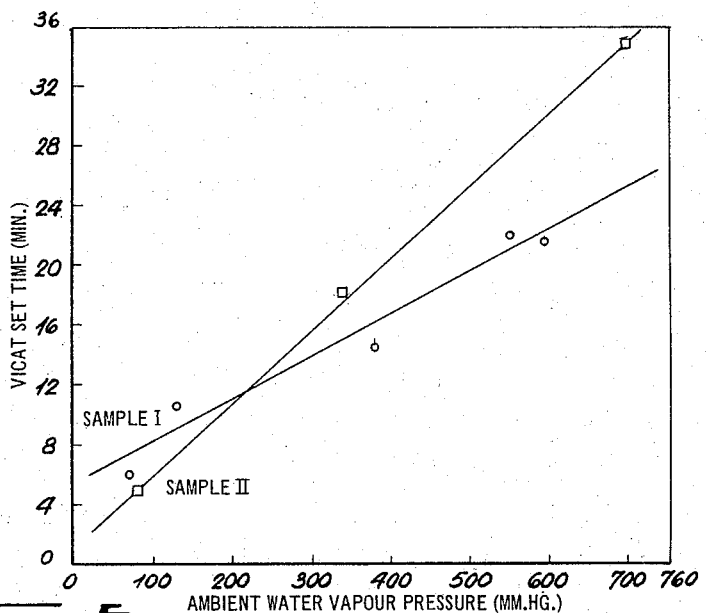
Figure 6:
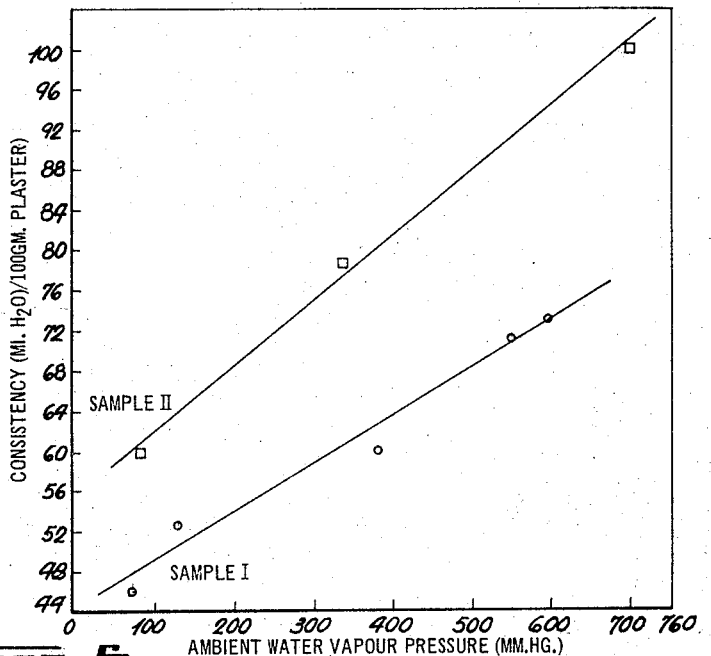
Figure 7:
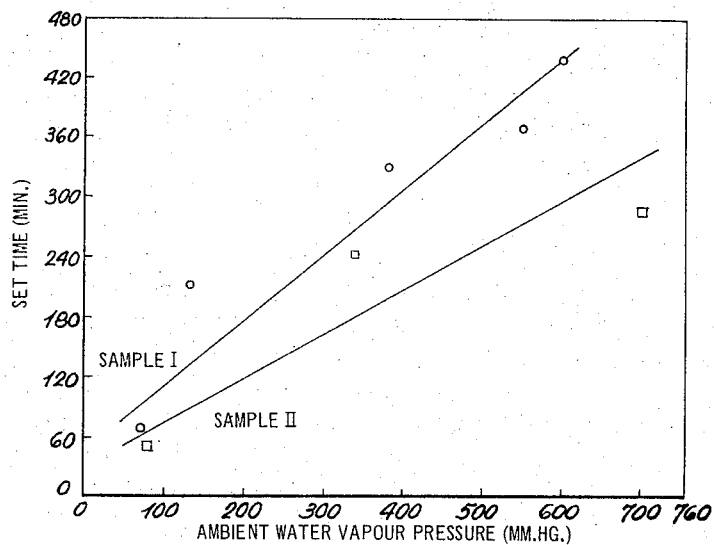
Figure 8:
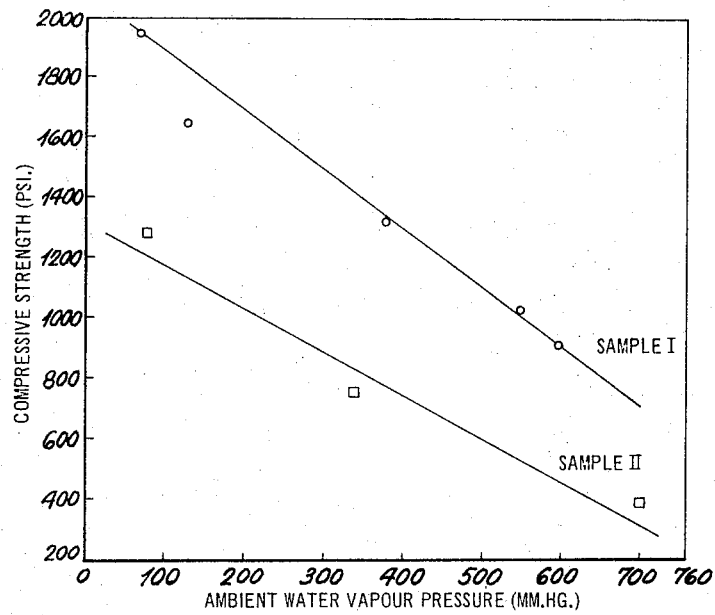

The invention will be further described with reference to the accompanying drawings in which FIG. 1 is a diagrammatic representation of a type of calcining apparatus affording means of controlling and measuring the water vapour pressure during calcining;

FIG. 2 is a diagram representing the variation of temperature within the apparatus during calcining;

FIGS. 3 to 8 consist of a series of diagrams showing the relationship between the ambient water vapour pressure and properties of the calcined product—properties such as particle density, heat of solution, Vicat set time, consistency, set time and compressive strength, for two samples of gypsum of different origins.

An apparatus of the type shown in FIG. 1 was used to establish the relationship underlying the practice of the present invention. It consists essentially of inner column 2 constructed from standard high-temperature and shock-resistant glass pipe units, and air cabinet 3 providing a controlled-temperature insulating enclosure over column 2. An air inlet is provided, consisting of pipe 4 and control valves 5, and leading to rotameter 8 and thence to preheater 9, from where a pipe or hose 10 leads inside an extension 11 of column 2. A steam inlet is provided by pipe 12 and control valve 13, leading into extension 11 of tube 2 where it terminates in substantially the same area where pipe 10 terminates. Column 2 is provided with plate 14 in the bottom portion thereof, the plate serving as support for the gypsum charge placed in the tube, while in the upper portion of the tube gas outlet 15 leads to water-cooled condenser 16 which is open to the atmosphere at 17. Removable plate 23 covers the inlet for the gypsum charge located at the top of the apparatus. A mercury U-tube manometer is connected by one arm to the apparatus at 18, the second arm of the manometer being open to the atmosphere. A thermocouple is located at 19 to measure the temperature of the air-steam mixture passing into column 2, and another thermocouple is located at 20 to measure the temperature within the fluidized gypsum charge. The temperature within the air cabinet is controlled by electric heaters 6, and recorded by thermocouples 7 distributed as indicated, while air circulation is maintained by blower 21. Window 22 is provided for observation.

Air and steam enter the apparatus countercurrently and form a mixture which passes through extension 11 and up column 2 through support plate 14. The gypsum charge resting on plate 14 is fluidized and is calcined in the zone immediately above plate 14. The effluent gases pass up the column to the condenser from which the condensate is collected and measured. The total pressure drop across plate 14 and the gypsum charge is measured by means of manometer 18; this pressure can be maintained substantially constant and at the desired air-steam ratio by controlling manually the inlet air and steam flows. From a knowledge of the total air flow through the apparatus during calcination and of the total volume of condensate received from the condenser (the condensate including both the added steam and the water of crystallization liberated from the gypsum), the average ambient water vapour pressure during calcination can be calculated. Since the apparatus is open to the atmosphere at the effluent gas end, only partial water pressures below one atmosphere (or at most equal to one atmosphere) are obtained.

In the use of this equipment it has been found conventient to use gypsum of a uinform particle size to ensure adequate fluidization. The particle size may vary within fairly wide limits, e.g. 100 to 325 mesh. The cabinet and the inlet air temperatures are first allowed to reach values in excess of 100° C., generally in the range between 140° C. and 150° C. Plate 23 is then quickly removed, the gypsum charge introduced into the top of the apparatus whence it falls into the fluidization zone, and the plate is quickly restored to its position without seriously disturbing the temperature distribution within the apparatus.

The temperature is recorded within the fluidized mass by means of thermocouple 20 and a typical pattern of temperature variation is shown in FIG. 2. From point A to point B the inlet air stream is pre-heated together with the apparatus, until a temperature between 140° and 150° C. is reached. The gypsum charge is introduced at B, causing a sudden drop in temperature to point C, as the cold charge contacts the thermocouple. The gypsum charge is heated by the dry air stream until its temperature approaches about 100° C., at D, at which point steam is added to the air stream to obtain the desired air-steam ratio and the ratio is controlled as described earlier. A small rapid increase in temperature, to point E, occurs in the charge, due to the additional source of heat and to altered heat capacity of the medium, then a more gradual increase to F, at which time the heat consumed in the dehydration becomes appreciable and the temperature of the fluidized mass drops slightly and remains substantially constant over the period of dehydration from G to H. At point H, as dehydration to the hemihydrate nears completion, the temperature within the fluidized mass begins to rise and at point F the calcination is stopped and the sample removed from the apparatus and rapidly cooled to room temperature.

Hemihydrates were produced in the manner above described from a massive gypsum (Sample I) ground to a particle size of 200–270 mesh and calcined under different ambient water vapour pressures. (This range of particle size was selected as being particularly suitable for the fluidized bed procedure used in this instance, but in no way constitutes a general limitation on the particle size.) The hemihydrates were then exposed for 14 days at 65% relative humidity and 70° F., and the properties of the hemihydrates were then determined in accordance with methods known in the art. The measured properties included heat of solution, density and Vicat set time. The hemihydrates were also mixed with a standard quantity of sand and water and with a standard commercial retarder, and the mixture so formed was tested for consistency, set time, and for compressive strength. Table I summarizes the results of these tests. The α-hemihydrate content was obtained from heat of solution data following the calculations of Kelley, Southard and Anderson. (Reference: U.S. Bureau of Mines Technical Paper No. 625 (1941).)

TABLE I.—HEMIHYDRATES FROM A MASSIVE GYPSUM (SAMPLE I), PARTICLE SIZE 200-270 MESH, CALCINED AT VARYING AMBIENT WATER VAPOUR PRESSURES

|  | Ambient Water Vapour Pressure (mm.) | | | | |
|---|---|---|---|---|---|
|  | 70 | 130 | 380 | 550 | 600 |
| Hemihydrate properties: | | | | | |
| Hemihydrate content (percent) | 96.78 | 98.19 | 97.46 | 98.02 | 97.82 |
| Heat of Solution (cal./mole) | +1,135 | +1,255 | +1,340 | +1,445 | +1,480 |
| Calculated α-hemihydrate content (percent) | 6.8 | 30.4 | 46.8 | 67.4 | 74.0 |
| Density (gm./cc.) | 2.536 | 2.503 | 2.464 | 2.435 | 2.434 |
| Vicat Set Time (min.) | 6.0 | 10.5 | 14.5 | 22.0 | 21.5 |
| Properties of Mixture: [1] | | | | | |
| Consistency (ml./100 gm. hemihydrate) | 46.0 | 52.5 | 60.0 | 71.0 | 73.0 |
| Set Time (min.) | 69 | 215 | 330 | 367 | 439 |
| Compressive Strength (p.s.i.) | 1,955 | 1,650 | 1,330 | 1,030 | 912 |

[1] Mixture: 200 gm. sand, 100 gm. hemihydrate, 0.075 gm. commercial retarder.

These results, further represented graphically in the diagrams of FIGS. 3 to 8 (Sample I), show clearly the correlation between the particular properties and the ambient water vapour pressure. Thus, the heat of solution increases linearly with the said vapour pressure from a value of +1135 cal./mole corresponding to an ambient water vapour pressure during calcination of 70 mm. Hg to a value of +1480 cal./mole corresponding to a vapour pressure of 600 mm. Hg. The particulate density (measured in gm./cc.) show an essentially linear decrease with increasing water vapour pressure during calcination, the apparent greater scatter in the experimental data here being due primarily to the errors inherent in the determination of particulate density by fluid displacement techniques. Vicat set time (in minutes) increases substantially linearly with the increase in vapour pressure from 6 min. corresponding to 70 mm. Hg to 21.5 min. corresponding to 600 mm. Hg.

The properties of the hemihydrates in formulations were tested in this instance on a mixture containing 0.075% of a commercial retarder and a 2:1 ratio of sand. The consistency of the mixture shows a substantially linear variation from 46 ml./100 gm. (for vapour pressure of 70 mm. Hg) to 73 ml./100 gm., the set time similarly increases with the increase in vapour pressure and the compressive strength decreases from a value of 1955 p.s.i. at 70 mm. vapour pressure to 912 p.s.i. at 600 mm.

The practice of the invention will now be apparent. To illustrate it further on the example of compressive strength, it will be seen from the diagram in FIG. 8 that to any value of compressive strength between about 2100 p.s.i. and about 600 p.s.i. will correspond a water vapour pressure between 0 and 760 mm. Hence if a compressive strength value of C is desired in the formulation using the hemihydrate, a corresponding vapour pressure $p$ is maintained during calcining, the value of said pressure $p$ being derived by simple proportion from the diagram. Thus the value of $p$ in the above example can be calculated by observing that the difference between C and 2100 will be in the same proportion to $p$ as 2100-600 will be to 760, or in more general terms, and assuming $C_0$ to correspond to vapour pressure 0 mm., and $C_{760}$ to vapour pressure 760 mm.

$$\frac{C - C_0}{p} = \frac{C_{760} - C_0}{760}$$

whence $p$ can be easily calculated.

Table II shows the variation in the properties of hemihydrates produced from a selenitic gypsum (Sample II) in the manner described in detail herein above.

TABLE II.—HEMIHYDRATES FROM A SELENITIC GYPSUM (SAMPLE II), PARTICLE SIZE 100 TO 200 MESH, CALCINED AT VARYING AMBIENT WATER VAPOUR PRESSURES

|  | Ambient Water Vapour Pressure (mm.) | | |
|---|---|---|---|
|  | 80 | 340 | 700 |
| Hemihydrate Properties: | | | |
| Hemihydrate content (percent) | 96.26 | 96.23 | 96.71 |
| Heat of Solution (cal./mole) | +1,240 | +1,325 | +1,430 |
| Calculated α-hemihydrate content (percent) | 26.9 | 43.5 | 63.8 |
| Density (gm./cc.) | 2.592 | 2.578 | 2.545 |
| Vicat set time (min.) | 5.0 | 18.0 | 35.0 |
| Properties of mixture: [1] | | | |
| Consistency (ml./100 gm. hemihydrate) | 60.0 | 78.5 | 100.0 |
| Set Time (min.) | 53 | 240 | 285 |
| Compressive Strenght (p.s.i.) | 1,285 | 750 | 390 |

[1] Mixture: 200 gm. sand, 100 gm. hemihydrate, 0.075 gm. commercial retarder.

The results of Table II are further illustrated on diagrams FIGS. 3 to 8 (Sample II). It will be evident that these results confirm the substantially linear relationship between the properties of the hemihydrates (and formulations therewith) and the ambient water vapour pressure during calcining.

What I claim is:
1. In the preparation of calcined gypsum consisting essentially of calcium sulphate hemihydrate from natural gypsum material, the method of controlling physical properties of said hemihydrate, thereby to obtain a preselected value C of one of said properties, comprising calcining a first sample of said material at atmospheric pressure under a first partial water vapour pressure $p_1$, to obtain a first sample of hemihydrate, determining value $c_1$, of said one of said properties of said first sample of hemihydrate, calcining a second sample of said material at atmospheric pressure under a second partial water vapour pressure $p_2$ to obtain a second sample of hemihydrate $p_2$ being substantially greater than $p_1$, determining value $c_2$ of said one of said properties of said second sample of hemihydrate, determining a partial water vapour pressure P corresponding to said preselected value C by means of the equation $$P - p_1 = \frac{C_2 - c_1}{c - c_1}(p_2 - p_1)$$

calcining said natural gypsum material at a calcining temperature at atmospheric pressure, while maintaining an ambient partial water vapour pressure during said calcining substantially equal to P.

2. The method according to claim 1 wherein the calcining of said natural gypsum material is carried out by intimately mixing an air-steam mixture with particles of said natural gypsum material at a calcining temperature.

3. The method according to claim 1 wherein said property is consistency.

4. The method according to claim 1 wherein said property is set time.

5. The method according to claim 1 wherein $p_1$ is a water vapour pressure substantially close to 0 mm. Hg and $p_2$ is a water vapour pressure substantially close to 760 mm. Hg.

References Cited by the Examiner

FOREIGN PATENTS 564,225  10/1958  Canada.

OSCAR R. VERTIZ, *Primary Examiner.*

MAURICE A. BRINDISI, E. C. THOMAS,

*Assistant Examiners.*